United States Patent
Matriano

(10) Patent No.: US 9,470,959 B2
(45) Date of Patent: *Oct. 18, 2016

(54) PHOTO BOOTH WITH INDIRECT LIGHTING SYSTEM

(71) Applicant: Jason Bananal Matriano, New Rochelle, NY (US)

(72) Inventor: Jason Bananal Matriano, New Rochelle, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/073,794

(22) Filed: Mar. 18, 2016

(65) Prior Publication Data

US 2016/0195797 A1    Jul. 7, 2016

Related U.S. Application Data

(63) Continuation of application No. 14/947,551, filed on Nov. 20, 2015, now Pat. No. 9,323,133.

(60) Provisional application No. 62/085,429, filed on Nov. 28, 2014.

(51) Int. Cl.
  *G03B 15/07* (2006.01)
  *G03B 17/53* (2006.01)
  *G03B 15/06* (2006.01)

(52) U.S. Cl.
  CPC .............. *G03B 15/07* (2013.01); *G03B 15/06* (2013.01); *G03B 17/53* (2013.01)

(58) Field of Classification Search
  CPC ....... G03B 17/53; G03B 15/06; G03B 15/07
  See application file for complete search history.

(56) References Cited

U.S. PATENT DOCUMENTS

| | | | | |
|---|---|---|---|---|
| 2,224,579 A * | 12/1940 | Wheelan | ............... | G03B 15/06 396/376 |
| 5,196,876 A * | 3/1993 | Thayer | ................... | G03B 17/53 348/135 |
| 5,383,099 A * | 1/1995 | Peters | ................... | G03B 15/06 362/18 |
| 9,323,133 B1 * | 4/2016 | Matriano | ............... | G03B 17/53 |
| 2004/0179233 A1 * | 9/2004 | Vallomy | ............... | G03B 17/53 358/1.15 |

* cited by examiner

*Primary Examiner* — W B Perkey
(74) *Attorney, Agent, or Firm* — Patentfile, LLC; Bradley C. Fach; Steven R. Kick

(57) ABSTRACT

A photo booth with an improved lighting system may comprise a light reflecting element, a rear wall panel, and a side wall panel positioned to form a booth interior chamber which may function as an enclosure configured to receive one or more subjects. A camera may be positioned to the front of the booth and directed to take images of the booth interior chamber. A light source may be positioned at a location above the camera and oriented to direct an initial burst of light downward towards a portion of the light reflecting element positioned above the camera.

15 Claims, 7 Drawing Sheets

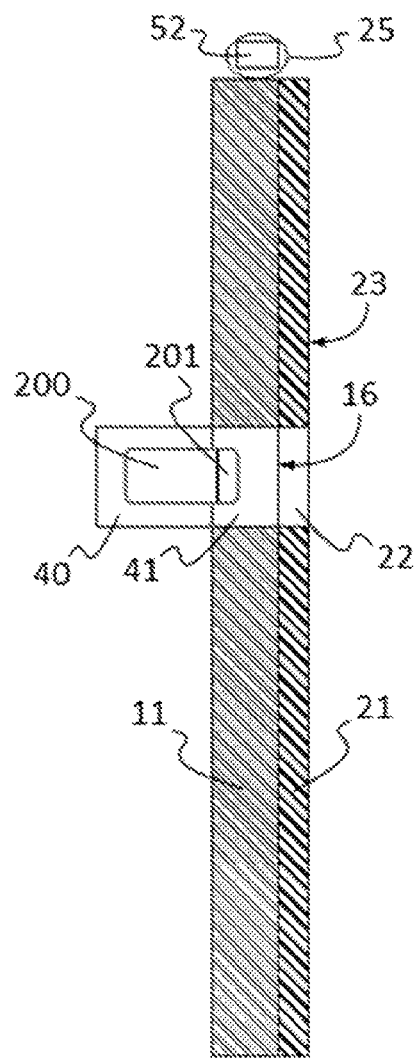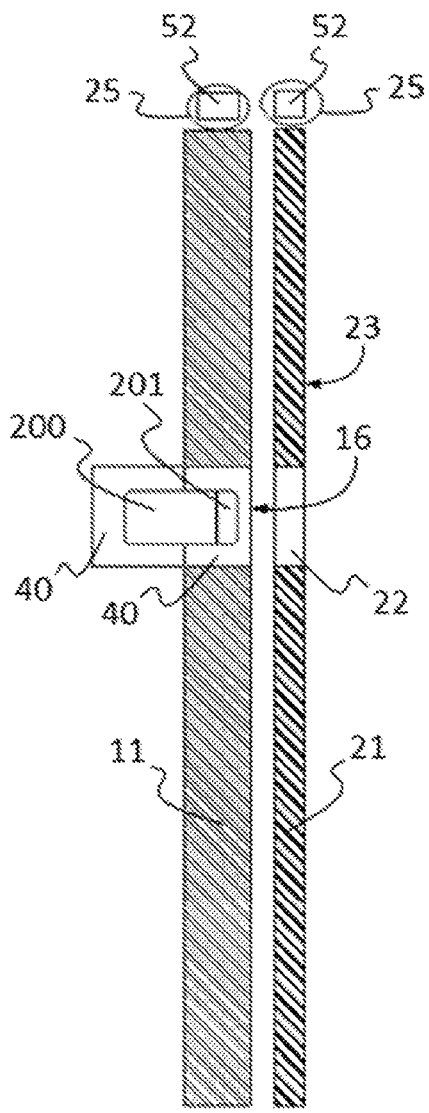
*FIG. 4A*  *FIG. 4B*

PHOTO BOOTH WITH INDIRECT LIGHTING SYSTEM

CROSS REFERENCE TO RELATED APPLICATIONS

This application is a continuation of and claims priority to co-pending U.S. application Ser. No. 14/947,551, filed on Nov. 20, 2015, entitled "PHOTO BOOTH WITH AN IMPROVED LIGHTING SYSTEM" which in turn claims priority to and the benefit of the filing date of U.S. Provisional Application No. 62/085,429, filed on Nov. 28, 2014, entitled "PHOTO BOOTH WITH INDIRECT LIGHTING SYSTEM", which is hereby incorporated by reference in its entirety.

FIELD OF THE INVENTION

This patent specification relates to the field of photography. More specifically, this patent specification relates to the field of indirect lighting systems for photo booths and the like.

BACKGROUND

Automatic photo studios or "photo booths" which are operable by one or more users for taking self-portraits are well known in the prior art. Generally, these photo booths comprise a physical structure such as a booth that also comprises a camera and photo printing unit. A user typically operates the photo booth by tendering a required amount of currency to the photo booth and positions themselves in front of a camera within the booth. One or more photos are then taken of the user by the camera in the photo booth. The photos may then be printed out by the photo booth or sent to a printer for alternative printing options.

Traditional photo booths are large and expensive usually lending to their stationary nature. Some photo booths have been made portable for deployment at events; however, these are also expensive thereby prohibiting placement in less than secure environments. Standalone camera devices, such as camera cellular phones, point and shoot cameras, tablet computers and laptop computers comprising a camera, and the like, have become a popular alternative to photo booths.

Photo booths are often enclosed with walls or opaque curtains to provide subjects with privacy and to entertain a more spontaneous attitude when being photographed without the general public being able to see within the booth. This arrangement often leads to poor lighting levels requiring the use of a flash or other lighting elements aimed directly at the subjects. Using direct flash or strobe lighting where the light is pointed directly at the subjects presents several drawbacks such as the "red eye effect" caused by the human retina reflecting red light directly back into the camera, harsh lighting effects where objects directly in front of the flash appear unnaturally brighter then the surrounding area, and the distraction effect where intense bursts of light directly into the eyes of subjects may cause disorientation for a short period of time.

There is therefore a need in the field for an improved lighting solution for photo booths and the like which serves to reduced the red eye and disorientation effect of direct lighting sources and which also improves photo image quality.

BRIEF SUMMARY OF THE INVENTION

A photo booth with an improved lighting system which is able to provide indirect lighting of subjects is provided. The photo booth with indirect lighting system presented herein offers many advantages over traditional direct flash lighting such as the reduction of the red-eye effect and the appearance of more balanced and natural looking photographs.

In some embodiments, a photo booth with an improved lighting system may a light reflecting element, a first side wall panel, and a rear wall panel positioned to form a perimeter of a booth interior chamber. A lens configured to be coupled to a camera may also be coupled to the photo booth and may be directed to take images of the booth interior chamber through an aperture in the light reflecting element. A light source may be positioned at a location within the booth interior chamber and oriented to direct an initial burst of light towards a portion of the light reflecting element. The initial burst of light may then be reflected off of the portion of the light reflecting element to form a reflected burst of light that may be directed away from the camera lens towards the booth interior chamber.

In further embodiments, a photo booth with an improved lighting system may comprise a front wall panel, a rear wall panel, and a side wall panel positioned to form the side perimeter of a booth interior chamber. The booth interior chamber may function as an enclosure configured to receive one or more subjects. A camera which includes a lens may be coupled to the photo booth, such as to the light reflecting element and/or to the front wall panel and may be directed to take images of the booth interior chamber. A light reflecting element may be positioned between the front wall panel and the booth interior chamber. A light source may be positioned at a location above the camera and oriented to direct an initial burst of light downward towards a portion of the light reflecting element positioned above the camera. The initial burst of light may then reflected off of the portion of the light reflecting element to form a reflected burst of light that may be directed and away from the camera.

In further embodiments, a photo booth with an improved lighting system may comprise a plurality of vertical support piers with a front wall panel, a rear wall panel, and a side wall panel positioned to form the side perimeter of a booth interior chamber. A ceiling structure may be supported by the support piers and may form the top perimeter of the booth interior chamber. The booth interior chamber may function as an enclosure configured to receive one or more subjects. A lens configured to be in communication with a camera may be coupled to the photo booth, such as to the light reflecting element and/or to the front wall panel and may be directed to take images of the booth interior chamber. A light reflecting element may be positioned between the front wall panel and the booth interior chamber. A light source may be coupled to the ceiling structure at a location above the camera and oriented to direct an initial burst of light downward towards a portion of the light reflecting element positioned above the camera. The initial burst of light may then reflected off of the portion of the light reflecting element to form a reflected burst of light that may be directed away from the lens.

In further embodiments, the photo booth may comprise a first side wall panel and a second side wall panel.

BRIEF DESCRIPTION OF THE DRAWINGS

Some embodiments of the present invention are illustrated as an example and are not limited by the figures of the accompanying drawings, in which like references may indicate similar elements and in which:

FIG. 4A—FIG. 4A depicts a sectional, through line 4-4 shown in FIG. 3, elevation view of an example of a front wall panel of photo booth with an improved lighting system with a light reflective element positioned on the interior side of the front wall panel as described in various embodiments herein.

FIG. 4B—FIG. 4B illustrates a sectional, through line 4-4 shown in FIG. 3, elevation view of an alternative example of an improved photo both with a light reflective element positioned proximate to the booth interior chamber as described in various embodiments herein.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
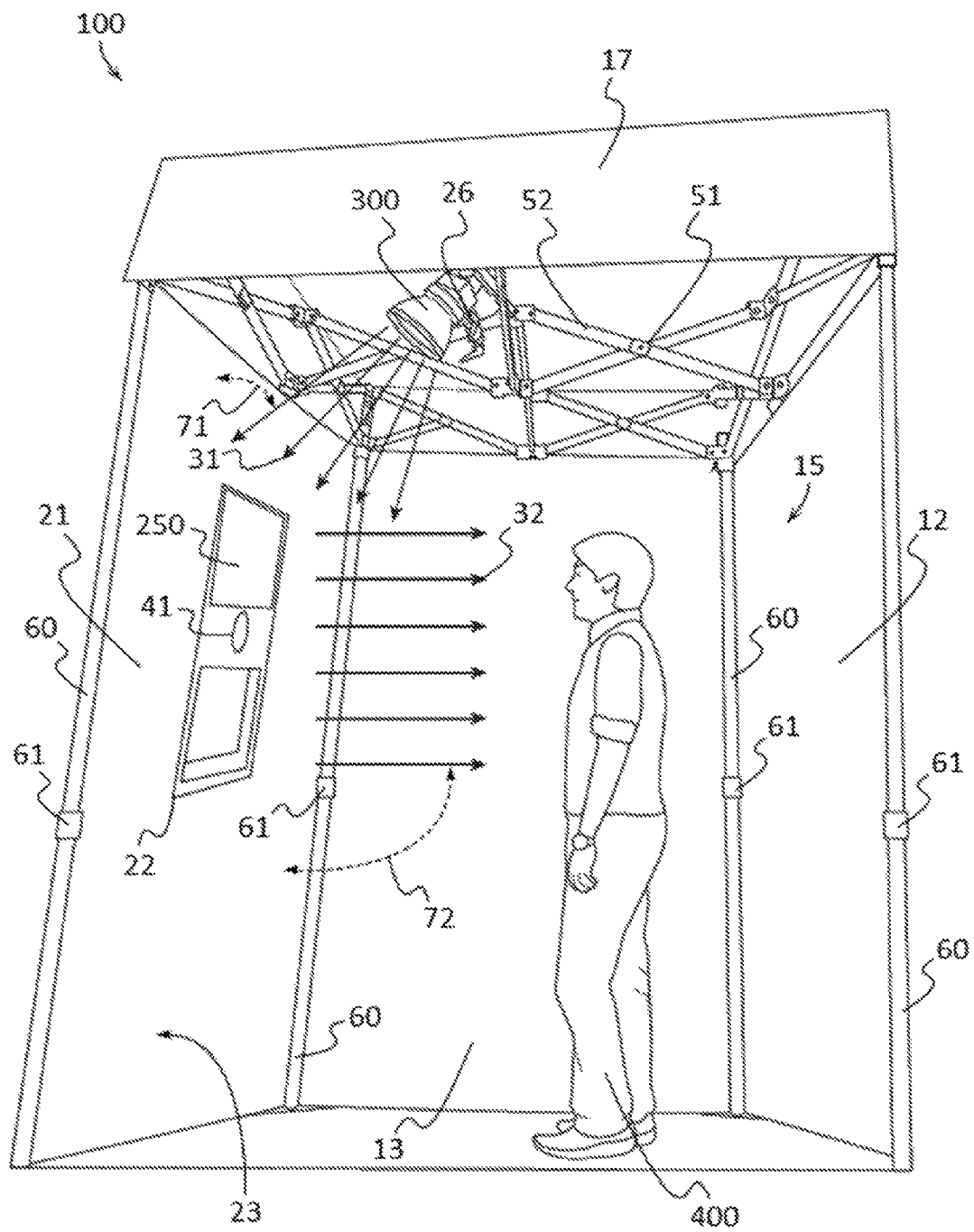
FIG. 1—FIG. 1 depicts a side perspective view of an example of a photo booth with an improved lighting system with one side wall panel removed showing a subject in the interior chamber of the booth according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

New photo booths with indirect lighting systems are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
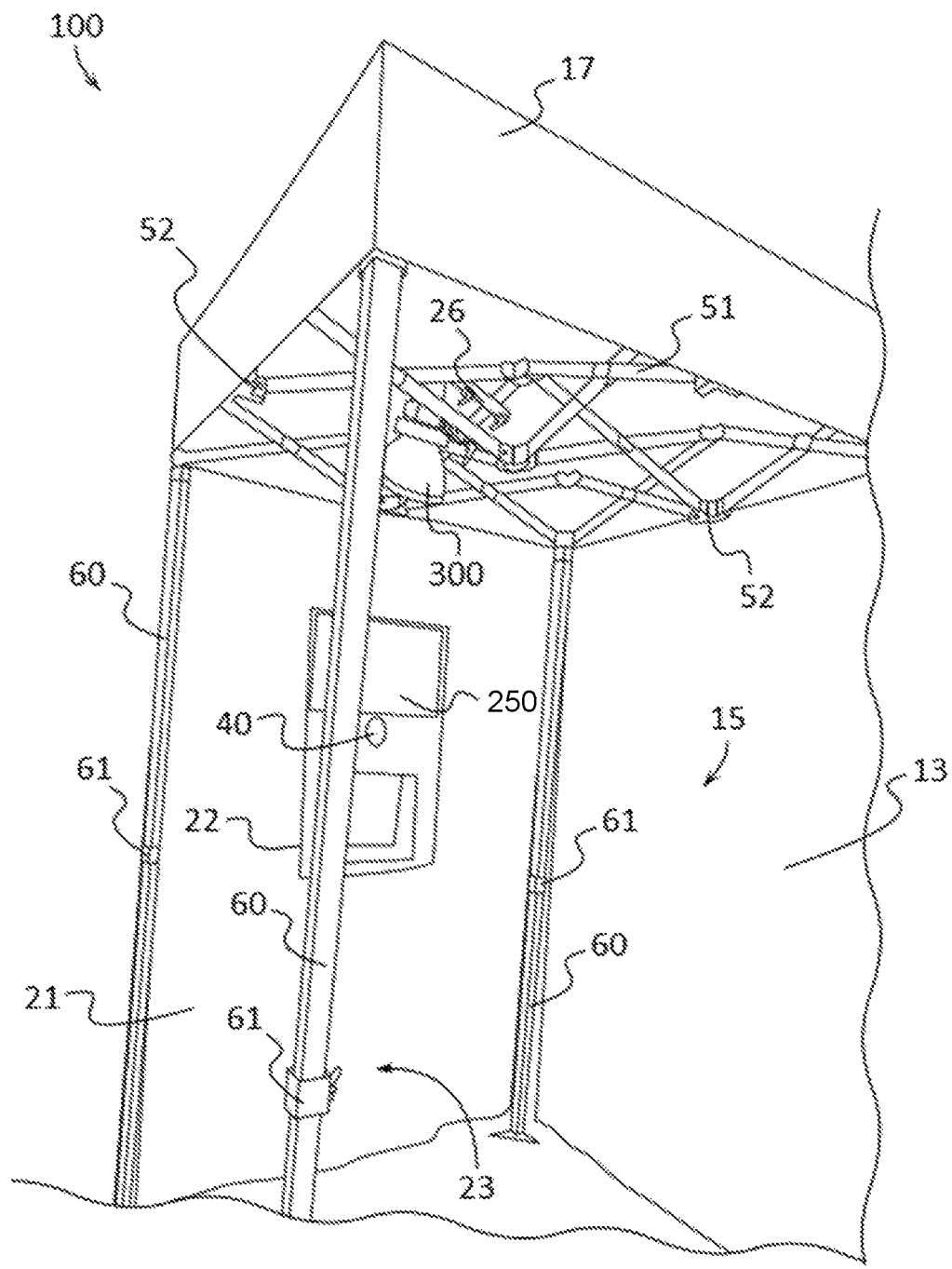
FIG. 2—FIG. 2 illustrates a rear side perspective view of a portion of an example of a photo booth with an improved lighting system with one side wall panel and the rear wall panel removed showing the interior chamber of the booth according to various embodiments described herein.

The present invention will now be described by example and through referencing the appended figures representing preferred and alternative embodiments. Referring now to FIG. 1 and FIG. 2, an example of a photo booth 100 with an improved lighting system is shown. In some embodiments, a photo booth 100 with an improved lighting system may comprise a light reflecting element 21, a first side wall panel 13, and a rear wall panel 12 positioned to form a perimeter of a booth interior chamber 15. A lens 201 (FIGS. 4A, 4B, and 6) which may be coupled to a camera 200 (FIGS. 4A, 4B, and 6) may be coupled to the photo booth 100, such as to the light reflecting element 21, and may be directed to take images of the booth interior chamber 15 through an aperture 22 in the light reflecting element 21. A light source 300 may be positioned at a location within the booth interior chamber 15 and oriented to direct an initial burst of light 31 towards a portion of the light reflecting element 21. The initial burst of light 31 may then be reflected off of the portion of the light reflecting element 21 to form a reflected burst of light 32 that may be directed away from the camera lens 201 towards the booth interior chamber 15.

In further embodiments, a photo booth 100 with an improved lighting system may comprise a front wall panel 11, a rear wall panel 12, and a side wall panel 13 positioned to form the side perimeter of a booth interior chamber 15. In further embodiments, the photo booth 100 may comprise a first side wall panel 13 and a second side wall panel 13. The booth interior chamber 15 may function as an enclosure configured to receive one or more subjects 400. A lens 201 (FIGS. 4A, 4B, and 6) may be coupled to the photo booth 100, such as to the light reflecting element 21 and/or to the front wall panel 11 and may be directed to take images of the booth interior chamber 15. A light reflecting element 21 may be positioned between the front wall panel 11 and the booth interior chamber 15. A light source 300 may be positioned at a location above the camera 200 and oriented to direct an initial burst of light 31 (FIG. 1) downward towards a portion of the light reflecting element 21 positioned above the camera 200. The initial burst of light 31 may then reflected off of the portion of the light reflecting element 21 to form a reflected burst of light 32 (FIG. 1) that may be directed and away from the lens 201.

In still further embodiments, a photo booth 100 with an improved lighting system may comprise a plurality of vertical support piers 60 with a front wall panel 11, a rear wall panel 12, and a side wall panel 13 positioned to form the side perimeter of a booth interior chamber 15. A ceiling structure 51 may be supported by the support piers 60 and may form the top perimeter of the booth interior chamber 15. In still further embodiments, the photo booth 100 may comprise a first side wall panel 13 and a second side wall panel 13. The booth interior chamber 15 may function as an enclosure configured to receive one or more subjects 400. A lens 201 configured to be coupled to a camera 200 (FIGS. 4A, 4B, and 6) may also be coupled to the photo booth 100, such as to the front wall panel 11, and may be directed to take images of the booth interior chamber 15. A light reflecting element 21 may be positioned between the front wall panel 11 and the booth interior chamber 15. A light source 300 may be coupled to the ceiling structure 51 at a location above the lens 201 and oriented to direct an initial burst of light 31 (FIG. 1) downward towards a portion of the light reflecting element 21 positioned above the camera 200. The initial burst of light 31 may then reflected off of the portion of the light reflecting element 21 to form a reflected burst of light 32 (FIG. 1) that may be directed and away from the lens 201.

An optional display screen 250 may be mounted within and/or proximate to the camera cavity 40 and may be in communication with the digital camera 200 providing a means for subjects 400 to view and select photographs taken within the photo booth 100. In some embodiments, the photo booth may be configured to provide a camera cavity 40 or opening within the front wall panel 11 allowing a camera 200 (FIGS. 4A and 4B) and optionally a display screen 250 to be visible to one or more subjects 400 within the booth interior chamber 15. In preferred embodiments the camera 200 may be any commercially available digital camera but is preferably a high resolution DSLR camera of 8 megapixels or greater and a lens 201 may preferably be a lens configured to be secured to a DSLR camera. In other embodiments, a lens 201 may be any type of lens suitable for collecting light from the booth interior chamber 15. In further embodiments, a camera 200 and a display screen 250 may be in electronic communication with each other to allow the subject 400 or user to input information through the display screen 250 to the camera 200 and/or to allow images taken by the camera 200 through the lens 201 to be output to the subject 400 through the display screen 250.

Figure 3:
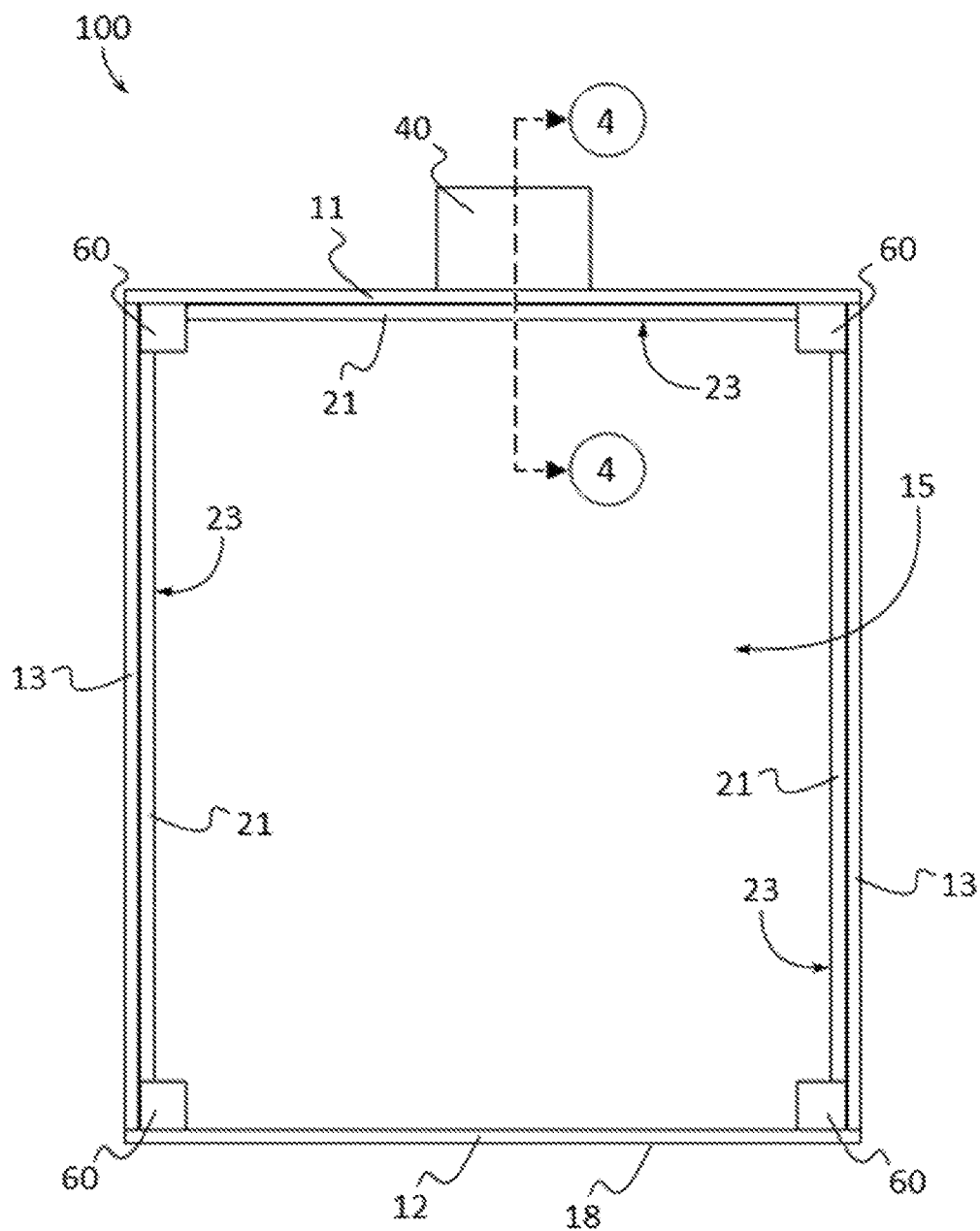
FIG. 3—FIG. 3 shows a top down plan view showing an example of a photo booth with an improved lighting system without a ceiling structure as described in various embodiments herein.

In some embodiments and in this example, the photo booth 100 may be a portable photo booth configured to be disassembled or collapsible into a compact state for easy storage and transportation. In some embodiments, the photo booth 100 comprises one or more, such as a plurality, of vertical support piers 60 which may be positioned to form the perimeter corners of the booth interior chamber 15 of the booth 100. In further embodiments, the support piers 100 may be positioned or arranged so the booth 100 has four sides, formed by the wall panels 11, 12, 13, 14, (FIG. 3) and may be arranged in a square or rectangular shape, however, booths 100 of other shapes such as round, oval, triangular, etc. are contemplated herein.

The support piers 60 may be made from metal such as aluminum or other rigid materials such as plastic or wood. In preferred embodiments, the support piers 60 are configured to be telescoping, collapsible, or foldable to reduce their size or length when not in use. In further embodiments, each support pier 60 may include multiple pier sub pieces, rods, or tubes with diameters or widths of various sizes allowing the sub pieces to slidably engage inside each other in a telescoping fashion. In some embodiments, each support pier 60 may have one or more adjustable locking elements 61 configured to temporally secure each of the pier sub pieces in either an extended telescoping configuration or a collapsed telescoping configuration, for example, by twisting the adjustable locking element 61 in a first direction to allow the pier sub pieces to freely move relative to each other and twisting the adjustable locking element 61 in a second direction preventing the pier sub pieces from freely moving relative to each other.

The top of the photo booth 100 may, in some embodiments, contain a top perimeter barrier 17 or ceiling made of rigid or flexible material such as canvas, vinyl, nylon, cardboard, drywall, wood, plastic or any other suitable material. In preferred embodiments, a ceiling structure 51 may be coupled to or supported by an upper portion of one or more support piers 60 to form the ceiling or top perimeter of the booth interior chamber 15. As shown by the figures, optionally a ceiling structure 51 may be made up of a series of support beams 52 or rods to form scaffolding with said beams 52 or rods being supported above the booth interior chamber 15 by the tops of the support piers 60. Also in preferred embodiments, the ceiling structure 51 may be foldable or collapsible to facilitate the transportation and storage of the photo booth 100 when not in use.

In some embodiments, the photo booth 100 may have a lateral perimeter barrier 18 made up of one or more wall panels 11, 12, 13, 14, and top perimeter barrier 17 located above a ceiling structure 51. Optionally, the wall panels 11, 12, 13, 14, may be removably coupled to the photo booth 100 such as to the support piers 60 and/or to the ceiling structure 51 with mounting fasteners 25 which may be temporary or removable fasteners such as hook and loop style fasteners (e.g. Velcro), hooks, pins, screws, buttons, zippers, clips, and the like.

In preferred embodiments, the wall panels 11, 12, 13, 14, and top perimeter barrier 17 may be generally opaque and configured to block ambient lighting from entering the booth interior chamber 15 allowing photo subjects 400 privacy while within the photo booth 100. In further embodiments, one or more wall panels 11, 12, 13, 14, and/or the top perimeter barrier 17 may be collapsible to allow portions of the photo booth 100 to be compacted into a smaller size and may be made from a collapsible or flexible material such as various types of flexible plastics such as polyvinyl chloride, natural or synthetic rubber, synthetic fabrics such as polyester, acrylic, nylon, rayon, acetate, spandex, lastex, and Kevlar, and natural fabrics such as coir, cotton, hemp, jute, canvas, flax, leather, linen, ramie, wool, silk, or any other suitable flexible natural or synthetic material including combinations of materials. In further embodiments, one or more wall panels 11, 12, 13, 14, and/or the top perimeter barrier 17 may be made from a rigid material such as drywall, hard plastics, cardboard, metal alloys, wood, hard rubbers, carbon fiber, fiber glass, resins, polymers or any other suitable materials including combinations of materials or any other suitable rigid material commonly used in the construction of photo booths 100.

In preferred embodiments and in the examples shown by the figures, one or more light sources 300 may be coupled to the ceiling structure 51, such as to one or more support beams 52, with a light source fastener 26 such as an adjustable clamp, bracket, hook, or other suitable fasteners common the field of portable lighting. The light source 300 may be in electrical communication with the camera 200 or a computer in order to provide a signal to engage a light source 300 to emit light at the proper time when the camera 200 is recording an image. The light source 300 may preferably be a mono strobe light but any suitable flash or lighting element, such as an electronic flash with a flash tube, an air-gap flash, a multi-flash, or any other type of light emitting flash may be used.

Referring now to FIGS. 1, 2, 3, and 4, the photo booth 100 of the present invention comprises one or more light reflecting elements 21 coupled along one or more lateral perimeter sides of the booth interior chamber 15. In preferred embodiments, the light reflecting element 21 may comprise a light reflecting surface 23 which may be configured to reflect between ten and one hundred percent of the visible light that strikes the light reflecting surface 23. In some embodiments, a light reflecting element 21 may comprise a flexible reflective material such as a white or gray colored fabric or material that may be constructed from satin, cotton, nylon, synthetic or non-synthetic fibers or any suitable material with high reflective properties which may reflect between ten and one hundred percent of the visible light that strikes the light reflecting surface 23. In further embodiments, a light reflecting element 21 may comprise a generally rigid reflective material such as a white or gray painted and/or colored wood, plastic, metal, cardboard, or any other generally rigid material which may be used to form portions of a photo booth and which may reflect between ten and one hundred percent of the visible light that strikes the light reflecting surface 23. In still further embodiments, one or more wall panels 103 may be painted on their interior surface with a paint with high reflective properties, such as to reflect between ten and one hundred percent of the visible light, to form a light reflective element 100. In still further embodiments, a light reflecting element 21 may be made from a reflective fabric material, such as aluminum impregnated fibers, Non Metalized micro-prismatic tape, Metalized Micro-Prismatic Reflective Tape, Reflexite SOLAS Metalized Micro-Prismatic Tape, aluminum foils, other metal alloy foils, Scotchlite™ retroreflective sheeting, or any other flexible reflective material which may comprise retroreflective glass beads, microprisms, or encapsulated lenses sealed onto a fabric or plastic substrate, or any other reflective material. In even further embodiments, the light reflecting element 21 may be made from a flexible material, such as aluminum impregnated fibers, satin, cotton, silk, polyester, polyethylene, polypropylene, polystyrene, polytetrafluoroethylene, polyvinyl chloride, nylon, and the like, allowing the light reflecting element 21 to be bent or folded into a compact or collapsed state.

In some embodiments, a light reflecting element 21 may be coupled to (FIG. 4A) or mounted proximate to (FIG. 4B) the front wall panel 11 and oriented to face the booth interior chamber 140. By way of non-limiting example, the light reflective element 21 as shown in FIG. 4A or FIG. 4B may be a sheet of fabric such as a satin, cotton, or nylon that is white or silver in color and of a size and shape substantially the same as the front wall panel. A light reflective element 21 positioned proximate to the front wall panel 11 may include a light reflecting element aperture 22 forming a cutout or opening of a size and shape substantially similar to the wall aperture 41 of the camera cavity 40 allowing the lens 201 of a camera 200 to shoot photos with the light reflective element 21 positioned between the camera 200 and the subject 400. In some embodiments, the photo booth 100 may comprise a light reflecting element 21 positioned between a side wall panel 13 and the booth interior chamber 15. In still further embodiments, the photo booth 100 may comprise two light reflecting elements 21 with each positioned between a side wall panel 13 and the booth interior chamber 15.

As perhaps best shown in FIGS. 4A and 4B, in some embodiments, the front wall panel 11 may comprise a camera cavity 40 which may be recessed into the front wall panel 11 and configured to receive the camera 200. A camera cavity 40 may include a wall aperture 41 which may be shaped to allow the lens 201 coupled to the camera 200 to view portions of the booth interior chamber 15. In some embodiments, a light reflecting element 21 may be coupled to the front wall panel 11 and a fastener 25 coupled to the ceiling structure 51, such as to a support beam 52 (FIGS. 1 and 2), may support both the light reflecting element 21 and the front wall panel 11 as shown in FIG. 4A. In other embodiments, a light reflecting element 21 may be positioned proximate to the front wall panel surface 16 and closer to the booth interior chamber 15, with the front wall panel 11 and the light reflecting element 21 each coupled to the ceiling structure 51, such as to a support beam 52 (FIGS. 1 and 2), with a fastener 25 as shown in FIG. 4B.

In some embodiments, a light reflecting element 21 may cover a portion of the front wall panel surface 16 proximate to the wall aperture 41 of the camera cavity 40. In further embodiments, a light reflecting element 21 may cover a portion of the front wall panel surface 16 proximate to and surrounding the wall aperture 41 of the camera cavity 40. In still further embodiments, a light reflecting element 21 may cover approximately ten percent to one hundred percent of the front wall panel surface 16 proximate to and surrounding the wall aperture 41 of the camera cavity 40. In preferred embodiments, a light reflecting element 21 may cover at least fifty percent of the front wall panel surface 16 proximate to and surrounding the wall aperture 41 of the camera cavity 40. In still further embodiments, the light reflecting element 21 may cover at least fifty percent of a front wall panel 11 forming part of a perimeter of the booth interior chamber 15.

As shown in FIGS. 4A and 4B, the light reflecting element 21 may comprise a light reflecting element aperture 22 which may be shaped and aligned with the wall aperture 41 to allow the lens 201 of the camera 200 to view portions of the booth interior chamber 15. The lens 201 may be recessed into the camera cavity 40 of the front wall panel 11 to prevent the initial burst of light 31 from contacting the lens 201. In some embodiments, the lens 201 of the camera 200 may be recessed into the camera cavity 40 so that the lens 201 is behind the front wall panel surface 16. In preferred embodiments, the lens 201 of the camera 200 may be recessed into the camera cavity 40 so that the lens 201 is behind the light reflecting element surface 23. The lens 201 may be coupled to the photo booth 100 such as to the optional front wall panel 11, to the camera cavity 40, and/or to the light reflective element 21. In further embodiments, the photo booth 100 may comprise a lens hood which may be coupled to the lend 201 to prevent the initial burst of light 31 (FIG. 1) from striking the lens 201.

In some embodiments, a light reflecting element 21 may be coupled to the interior side of the one or more wall panels 11, 13, by an adhesive or by other suitable means. In other embodiments, the light reflecting element 21 may be mounted as a standalone structure or panel (FIG. 4B) within the booth interior chamber 15 by connecting a top portion of the light reflecting element 21 to the ceiling structure 51 with a mounting fastener 25 (e.g. Velcro) or by other suitable means. In further embodiments, a light reflecting element 21 may be coupled to the ceiling structure 51 with a mounting fastener 25 to hang down from the ceiling structure 51 and form or function as a front wall panel 11 and/or a side wall panel 13 thereby allowing a front wall panel 11 and/or a side wall panel 13 to be optional. In preferred embodiments, a light reflecting element 21 may be positioned proximate to the front wall panel 11, two side wall panels 13, but not the rear wall panel 12.

Of particular interest, in preferred embodiments the light source 300 may be coupled to the ceiling structure 51 and oriented so that the most intense area of light or initial burst of light 31 (FIG. 1) generated by the light source 300 is directed at a first angle A 71 (FIG. 1) from vertical of about 45 degrees towards the front wall panel 11 and light reflecting element 21 at a location just above the camera cavity 40 whereas in traditional photo booths common in the art the light source 300 is directed directly at the subjects 400, such as onto their face, causing unnatural lighting effects. In further embodiments, the light source 300 may be oriented to direct an initial burst of light 31 down towards the front wall panel 11 and light reflecting element 21 at a first angle A 71 of between 30 and 60 degrees from vertical. The initial burst of light 21 may then be reflected off of the light reflecting element 21 to form a reflected burst of light 32 (FIG. 1) that is directed away from the lens 201 and towards a subject 400 within the booth interior chamber 15. In some embodiments, the reflected burst of light 32 may be directed away from the lens 201 and towards a subject 400 at a second angle B 72 (FIG. 1) from vertical of between 60 degrees and 120 degrees. Light from the reflected burst of light 32 may form indirect lighting of the subject 400 which may then be received by the camera lens 201. The camera lens 201 may be recessed behind the light reflecting element surface 23 so that preferably any stray light from the initial burst of light 31 may not enter the camera lens 201 and that preferably only reflected light, such as from a reflected burst of light 32 reflecting off of a subject 400, may enter the camera lens 201.

Thus, in preferred embodiments, the photo booth 100 is able to provide indirect lighting of subjects 400 by directing the initial burst of light 31, such as a flash or strobe lighting, from a light source 300 mounted above the subjects 400 at a first angle A 71 (FIG. 1) which is reflected off of one or more a light reflecting elements 21, such as a light reflecting element 21 positioned proximate to the front wall panel 11, and where the initial burst of light 31 is prevented from striking the lens 201 and is reflected back towards the subjects 400 as a reflected burst of light 32 at a second angle B 72 (FIG. 1) which is received by the lens 201. The indirect lighting system presented herein offers many advantages over traditional direct flash lighting such as the reduction of the red-eye effect and the appearance of more balanced and natural looking photographs.

Figure 5:
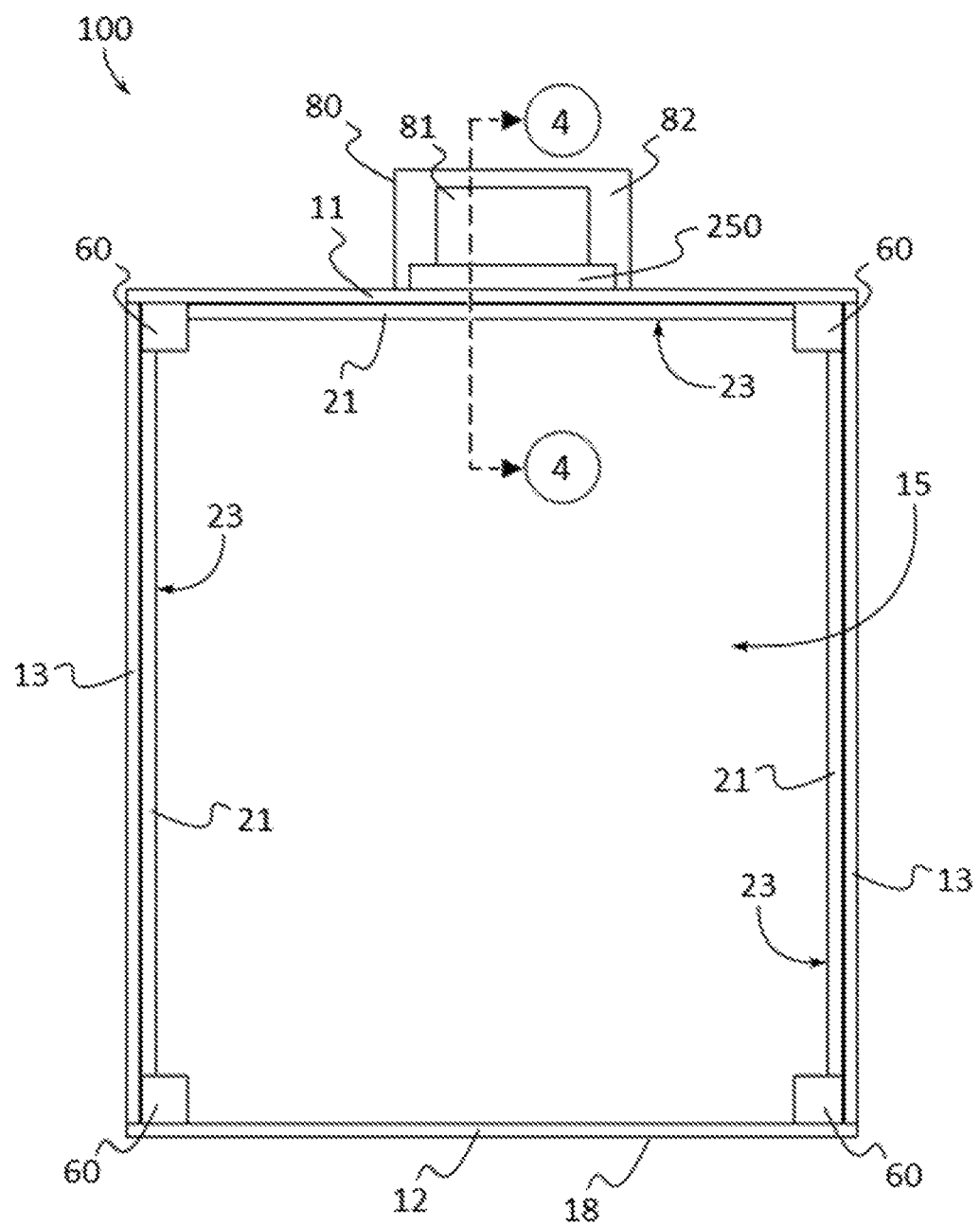
FIG. 5—FIG. 5 shows a top down plan view showing an example of a photo booth with an improved lighting system without a ceiling structure as described in various embodiments herein.

FIG. 5 shows a top down plan view showing an example of a photo booth with an improved lighting system 100 without a ceiling structure 51 (FIGS. 1 and 2) as described in various embodiments herein. In some embodiments, the photo booth 100 may comprise a light reflecting element 21, a first side wall panel 13, and a rear wall panel 12 positioned to form a perimeter of a booth interior chamber 15. A lens 201 which may be coupled to the photo booth 100 and coupled to a camera 200 may be directed to take images of the booth interior chamber 15 through an aperture in the light reflecting element 22. A light source 300 may be positioned at a location within the booth interior chamber 15 and oriented to direct an initial burst of light 31 (FIG. 1) towards a portion of the light reflecting element 21. The initial burst of light 31 may then be reflected off of the portion of the light reflecting element 21 to form a reflected burst of light 32 (FIG. 2) that is directed away from the camera lens 201 towards the booth interior chamber 15.

Figure 6:
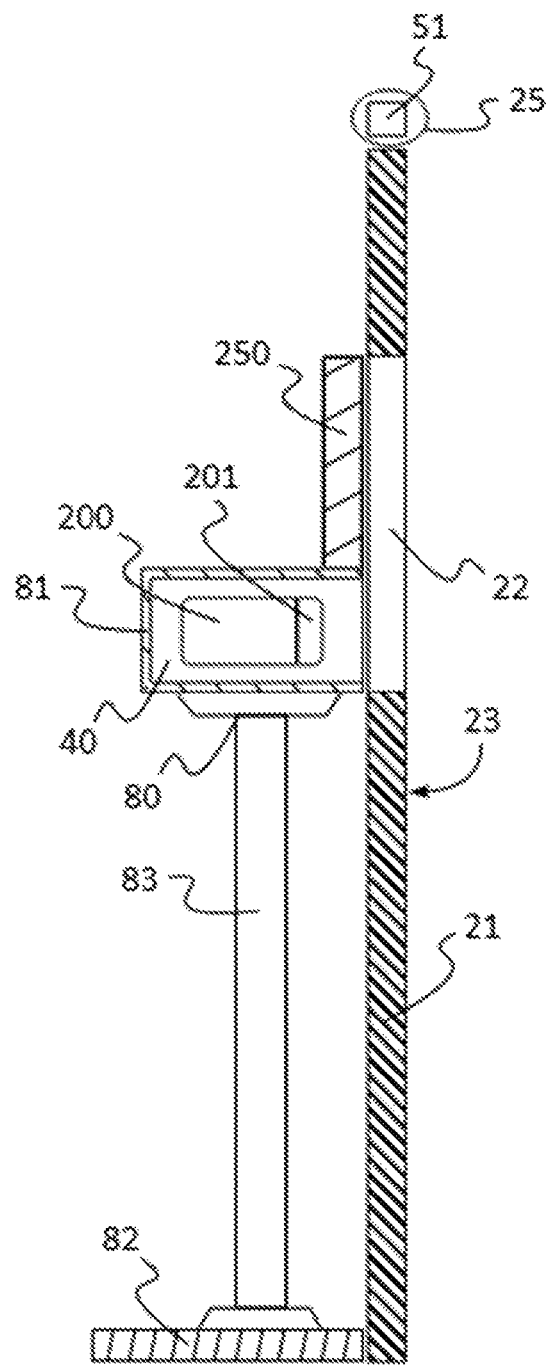
FIG. 6—FIG. 6 depicts a sectional, through line 6-6 of FIG. 5, elevation view of an example of a photo booth with light reflecting element acting a front side perimeter wall of the interior chamber of the booth according to various embodiments described herein.
Figure 7:
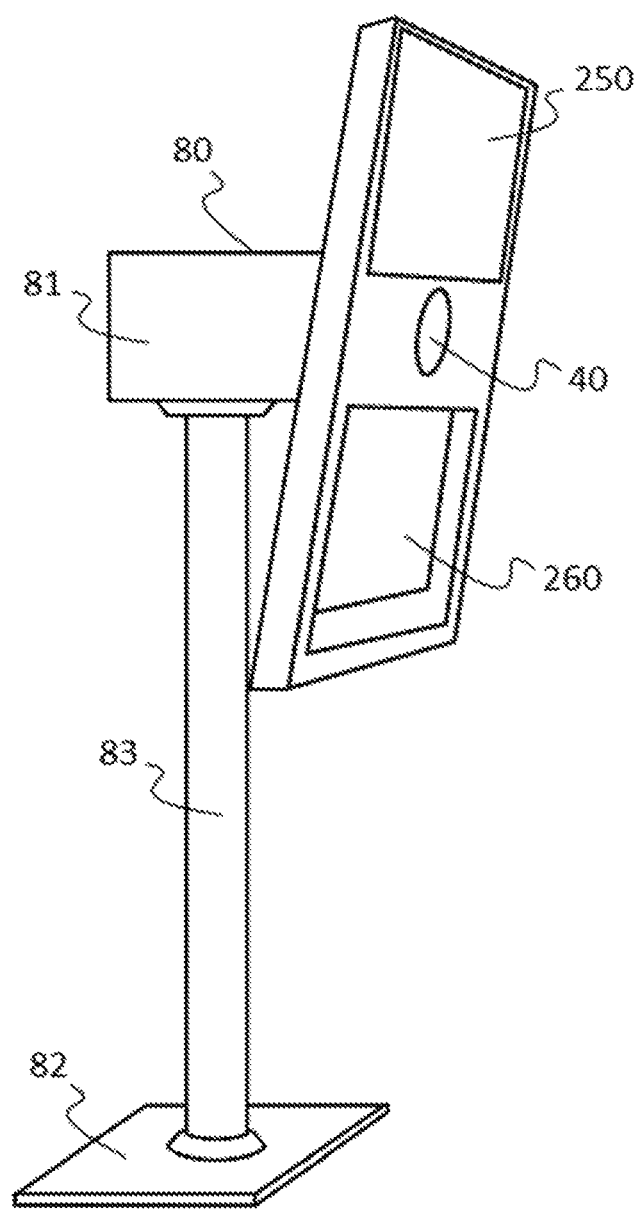
FIG. 7—FIG. 7 illustrates a perspective view of an example of a camera stand according to various embodiments described herein.

Turning now to FIG. 6 in which a sectional, through line 6-6 of FIG. 5, elevation view of an example of a photo booth 100 with a light reflecting element 21 acting a front side perimeter wall of the interior chamber 15 and to FIG. 7, in which an example of a camera stand 80 according to various embodiments described herein are illustrated. In some embodiments, the lens 201 and optionally the camera 200 may be recessed into a camera cavity 40 behind the light reflecting element 21 and/or surface of the light reflecting element 23 to prevent the initial burst of light 31 (FIG. 1) from contacting the lens 201. As shown in FIGS. 6 and 7, the photo booth 100 may optionally comprise a camera stand 80. The camera stand 80 may comprise a camera housing 81 which may receive or be coupled to the camera 200 so that the lens 201 of the camera 200 is within the camera cavity 40. In some embodiments, the camera cavity 40 may function as a lens hood. The camera housing 81 may define all or a portion of the camera cavity 40. In some embodiments, the camera 200 and the camera lens 201 may be received within the camera cavity 40 as shown in FIGS. 4A, 4B, and 6. In other embodiments, the camera 200 may be coupled to the camera housing 81 so that the lens 201 is within the camera cavity 40.

In some embodiments, a camera stand 80 may comprise a base 82 which may be coupled to the camera housing 81 with one or more support legs 83. Optionally, a display screen 250 may be coupled to the camera stand 80, such as to the camera housing 81, and the support legs 83 may be of a sufficient length to position the lens 201 and display screen 250 at a height suitable for use by a subject 400 (FIG. 1). In further embodiments, portions of the camera stand 80, such as one or more support legs 83, may be collapsible in a telescoping fashion similar as described above. Optionally, portions of the camera stand 80, such as the camera housing 81 and camera cavity 40, may be coupled to a light reflecting element 21 and/or to a front wall panel 11. A camera stand 80 may be made from any suitable rigid material such as may be used for a support pier 60 or ceiling structure 51.

As shown in FIG. 7, the light reflecting element 21 may comprise a light reflecting element aperture 22 which is of a sufficient size or diameter to allow light from the booth interior chamber 15 to enter the camera cavity 41. In further embodiments, the photo booth 100 may comprise a display screen 250, and the light reflecting element aperture 22 may be of a sufficient size or diameter to allow light from the booth interior chamber 15 to enter the camera cavity 41 and for a subject 400 to view the display screen 250. In still further embodiments, the light reflecting element 21 may comprise a first light reflecting element aperture 22 which is of a sufficient size or diameter and position to allow light from the booth interior chamber 15 to enter the camera cavity 41 and a second height reflecting element aperture 22 which is of a sufficient size or diameter and position to allow a subject 400 to view the display screen 250. Optionally, a photo tray 260 may be coupled to the camera housing 81 and/or display screen 250 which may be configured to receive one or more printed images that may be printed of a subject 400, such as with a printer which is common in the art, and from which a subject may withdraw the printed images.

While some materials have been provided, in other embodiments, the elements that comprise the photo booth with an improved lighting system 100 such as a side wall panel 13, a rear wall panel 12, support piers 60, an optional front wall panel 11, lens 201, optional camera stand 80, and/or an optional ceiling structure 51, may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the photo booth 100 may be coupled or connected together with heat bonding, chemical bonding, adhesives, by one or more fasteners, light source fasteners 26, and mounting fasteners 25, such as clasp type fasteners, clip type fasteners, rivet type fasteners, threaded type fasteners, other types of fasteners, or any other suitable joining method. In other embodiments, one or more of the elements that comprise the photo booth 100 may be coupled or removably connected by being press fit or snap fit together, by one or more fasteners, light source fasteners 26, and mounting fasteners 25, such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the photo booth 100 may be coupled by being one of connected to and integrally formed with another element of the photo booth 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A photo booth with an indirect lighting system, the photo booth comprising;
    a front wall panel having a light reflecting element, a first side wall panel, and a rear wall panel positioned to form a perimeter of a booth interior chamber;
    an aperture in the front wall panel adapted to allow passage of light from within the interior chamber to a camera cavity; and
    a light source positioned at a location within the booth interior chamber and oriented to direct an initial burst of light towards a portion of the light reflecting element, and wherein the initial burst of light is then reflected off of the portion of the light reflecting element to form a reflected burst of light that is directed away from the light reflecting element towards the booth interior chamber.

2. The photo booth of claim 1, wherein the camera cavity is configured to secure a camera with a lens in a position behind the light reflecting element to prevent the initial burst of light from contacting the camera lens.

3. The photo booth of claim 1, wherein the light reflecting element covers at least fifty percent of the front wall panel forming part of a perimeter of the booth interior chamber.

4. The photo booth of claim 1, wherein the light reflecting element has a reflecting surface made from a reflective fabric material.

5. The photo booth of claim 4, wherein the light reflecting surface is made from a flexible material selected from the group consisting essentially of aluminum impregnated fibers, satin, cotton, silk, polyester, polyethylene, polypropylene, polystyrene, polytetrafluoroethylene, polyvinyl chloride, and nylon.

6. The photo booth of claim 1, wherein the photo booth comprises a second side wall panel.

7. The photo booth of claim 1, wherein the light source is a flash.

8. The photo booth of claim 1, wherein the light reflecting element is positioned between the front wall panel and the booth interior chamber.

9. The photo booth of claim 1, wherein the wall panels are made of a collapsible material.

10. The photo booth of claim 1, wherein the wall panels are made of a rigid material.

11. The photo booth of claim 1, wherein the photo booth comprises a plurality of support piers.

12. The photo booth of claim 11, wherein the support piers are collapsible.

13. The photo booth of claim 12, wherein the photo booth comprises a ceiling structure supported by the support piers and forming a top perimeter of the booth interior chamber.

14. The photo booth of claim 13, wherein the light source is coupled to the ceiling structure.

15. The photo booth of claim 14, wherein the ceiling structure is collapsible.

* * * * *